United States Patent

[11] 3,631,976

| [72] | Inventors | Sheldon L. Coffelt<br>Susanville;<br>Paul R. Allen, Imyokern; John B. Crook,<br>Orinda, all of Calif. |
|---|---|---|
| [21] | Appl. No. | 8,790 |
| [22] | Filed | Feb. 5, 1970 |
| [45] | Patented | Jan. 4, 1972 |
| [73] | Assignee | Sierra Pacific Industries<br>Susanville, Calif. |

[54] BIN FOR LUMBER SORTER
9 Claims, 5 Drawing Figs.

[52] U.S. Cl.............................................. 209/74, 214/6 H
[51] Int. Cl............................................... B07c 3/02
[50] Field of Search.................................. 214/6 D, 6 H; 271/88; 209/74

[56] References Cited
UNITED STATES PATENTS

| 3,080,052 | 3/1963 | Hanbury.................. | 214/6 H |
| 3,255,895 | 6/1966 | Klinger..................... | 214/6 H |

*Primary Examiner*—Richard A. Schacher
*Attorney*—Townsend and Townsend

ABSTRACT: An expansible bin for receiving graded and sized lumber is provided between an overlying sorting conveyor and an underlying takeout conveyor. The bin includes at least two underlying and spanning bunks supported at either end by depending cables gathered and released from point immediately below the sorting conveyor. When the bunks are initially filled with lumber, they are drawn immediate the release point of the sorting conveyor to prevent board splitting due to droppage. As lumber accumulates in the bins, the bunks are sequentially lowered to provide together with the cable a bin of constantly expanding volume. When full, the bunks are lowered parallel to and below the takeout conveyor to provide for gradual placement of the sized and graded lumber in the bin on the takeout conveyor, and the cables released from one end of the bunks to permit the lumber to be converged away.

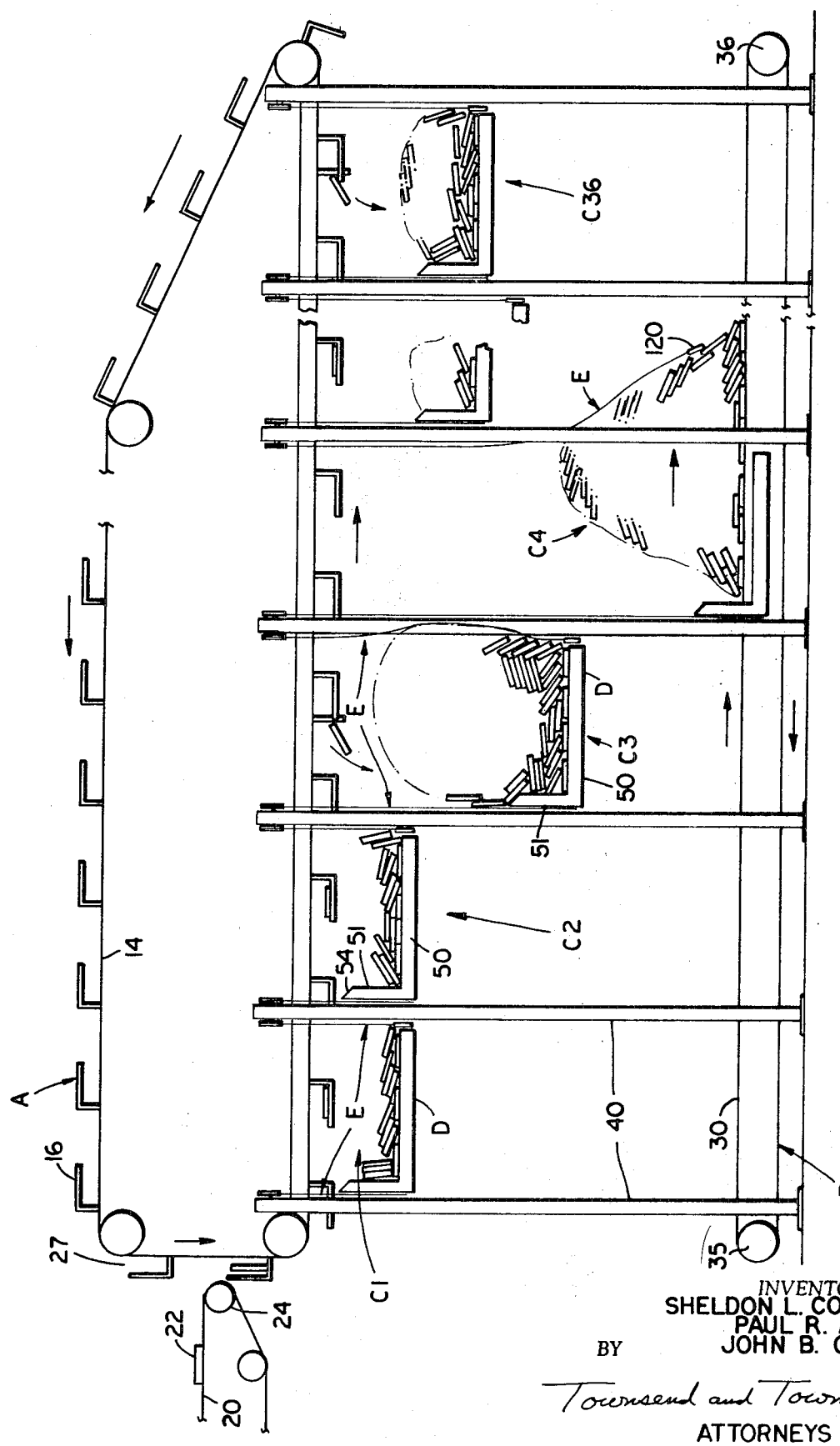

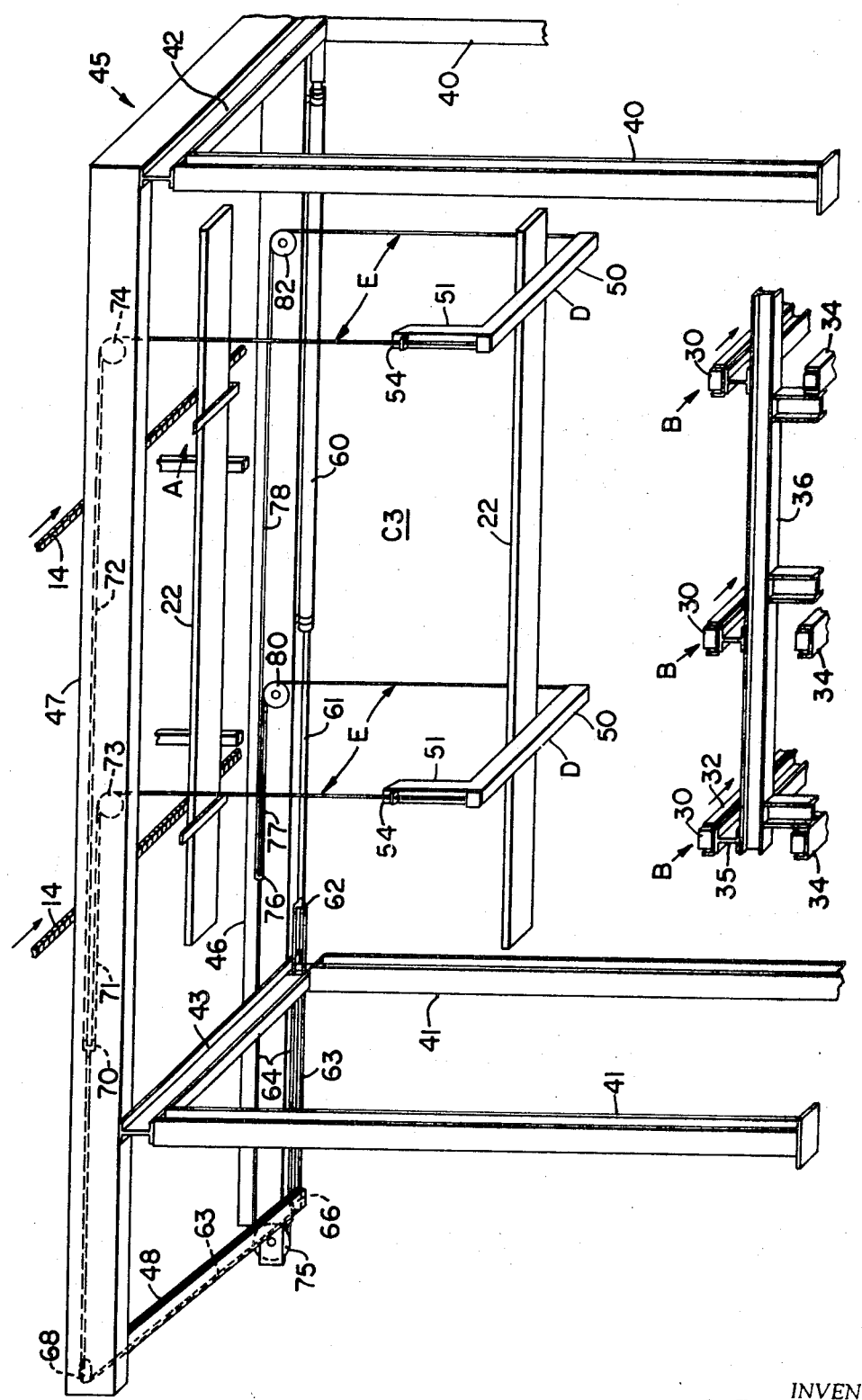

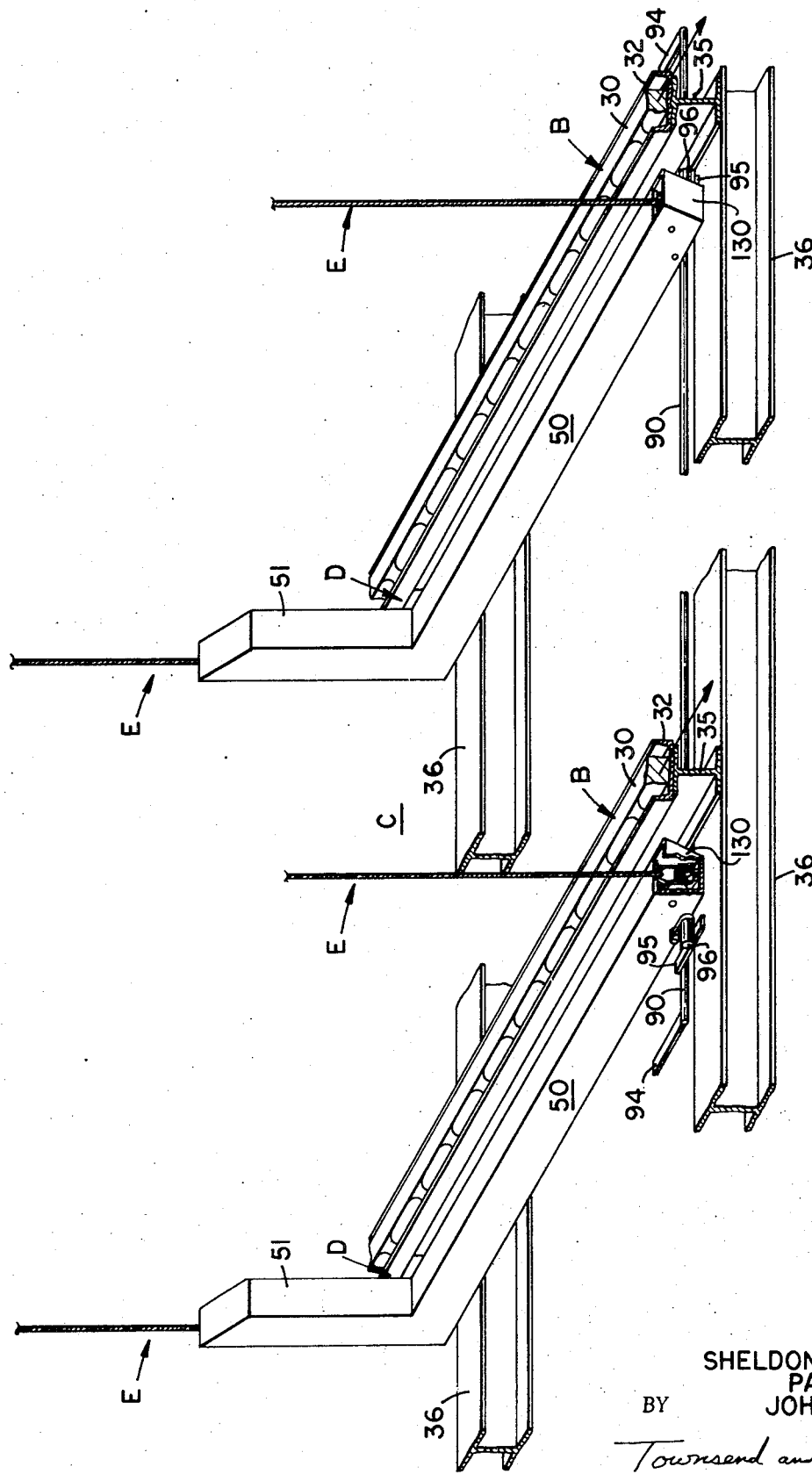

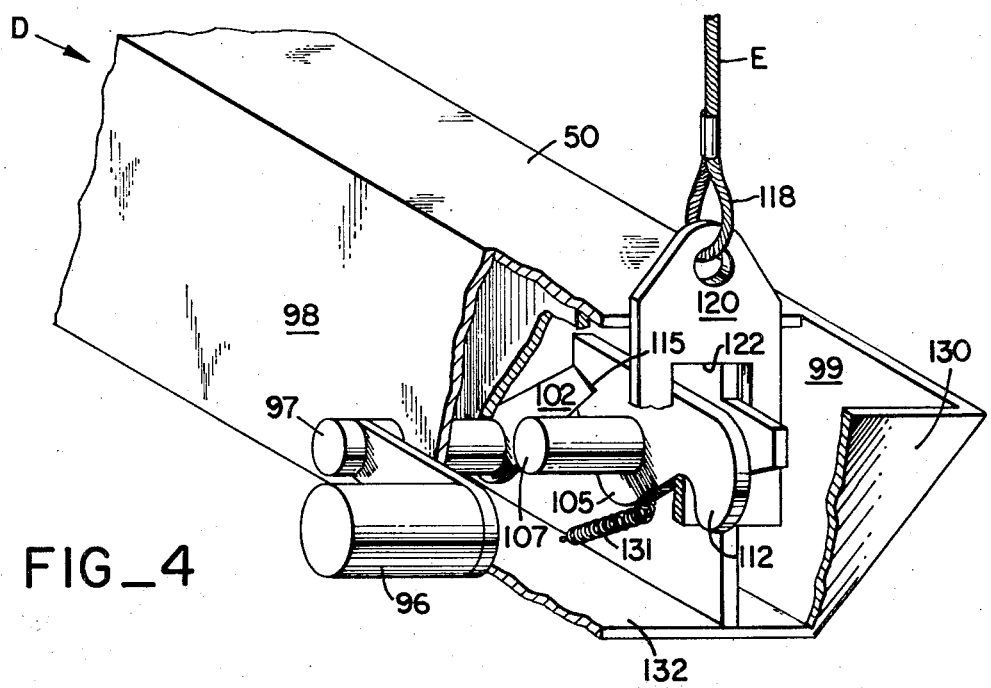
FIG_4
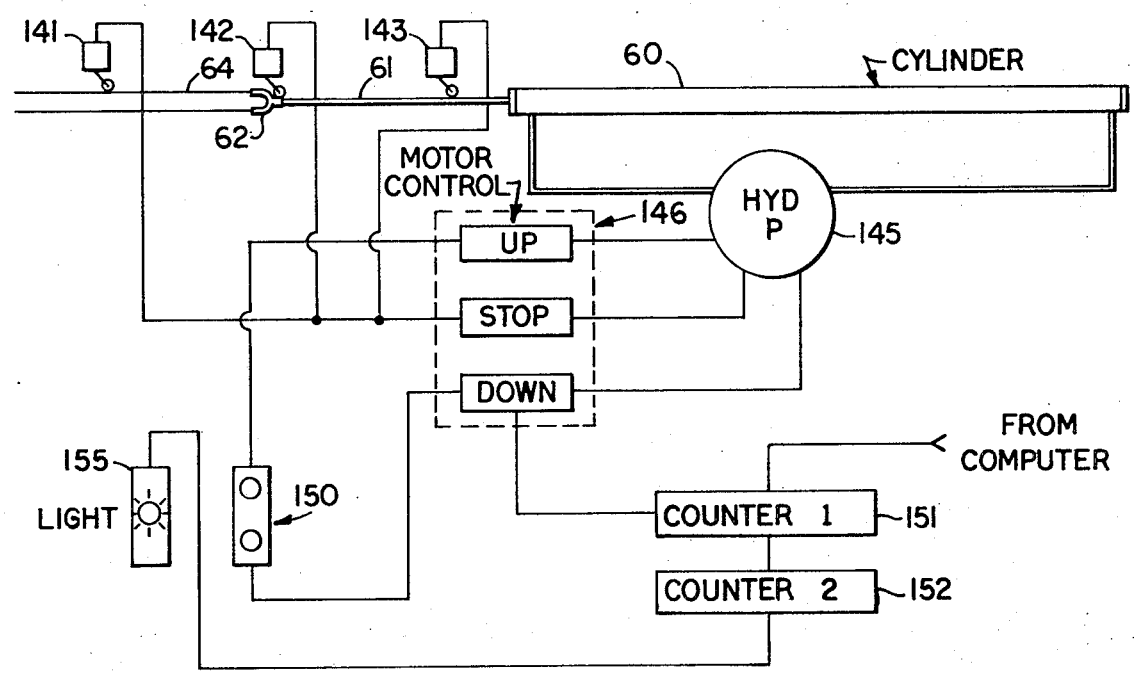
FIG_5
INVENTORS
SHELDON L. COFFELT
PAUL R. ALLEN
JOHN B. CROOK
BY Townsend and Townsend
ATTORNEYS

BIN FOR LUMBER SORTER

This invention relates to lumber sorters and, more particularly, to a bin for accumulating sized and graded lumber in counted stacks between an overlying sorting conveyor and an underlying takeout conveyor.

Remote sizing, grading and counting of fresh cut lumber has heretofore been provided by numerous automated sorting apparatuses. The most acceptable sorting apparatus has included an overlying sorting conveyor, an underlying takeout conveyor with a plurality of bins therebetween. The bins serve to accumulate in counted quantities the sized and graded lumber and to release to the takeout conveyor the lumber as sized, graded and counted.

Heretofore, the bins associated with such lumber sorters have included several disadvantages. First, such bins have included rigid bottoms, sidewalls and ends. As the bins are initially filled, lumber is frequently dropped a vertical distance sufficient to cause cracking and splitting of the lumber. This is because the bin bottoms cannot be moved in close proximity to the overlying sorting conveyor because their rigid sidewalls and ends interfere with the path of the sorting conveyor.

Secondly, the bins, when filled, must be tilted about their ends to release the accumulated lumber loads. Large gears and pivots are required to tilt the loaded bins from a position of receiving lumber from the sorting conveyor on one hand to a position where the lumber can fall clear of the bins on the other hand. The lumber is again dropped enmasse onto the underlying takeoff conveyor. Additional board splitting results.

An object of this invention is to provide a bin for use between an overlying sorting conveyor and an underlying takeoff conveyor which provides for minimum dropping of sized and graded lumber. Accordingly, at least two underlying bunks are dependingly supported at each end from overhead cables. The cables are gathered and released from a point immediately below the sorting conveyor. When the bins are initially filled, the cables are gathered to support the bunks immediate the release point of the sorting conveyor. As lumber accumulates, the bunks are lowered with the lowered cables providing expansible vertical sidewalls for the bunks. Upon accumulation of the desired quantity of lumber, the bunks are lowered below the takeoff conveyor; the cables remotely released from one end of the bunks, and the sequential batches of sized, graded and counted lumber released to the takeout conveyor for transport to other processing.

An advantage of this invention is that the bins provided can vertically expand in depth as filled; lumber dropped into the bins need fall only a minimum distance.

A further advantage of this invention is that the accumulated lumber is lowered onto the takeoff conveyor without further dropping.

Yet another advantage of this invention is that the lumber, during accumulation, is completely exposed. Boards skewed in dropping can be immediately seen and correctly stacked to prevent breakage. Moreover, the stacked lumber can be marked at its ends for identification if further processing.

A further object of this invention is to provide a simplified hydraulic piston-actuated apparatus for raising and lowering the bunks.

An advantage of this hydraulic piston actuation is that braking and entanglement problems encountered in ordinary reel type cable takeups are avoided.

Yet another advantage of the cable suspension is that the cables provide the bins with vertical sidewalls that can be gathered and released from overhead points without interference with the path of the sorting conveyor.

A further object of this invention is to provide for the remotely actuated release of the bunks from their cables at one end.

An advantage of this remote release is that the counted, graded and sized lumber stacks can be conveyed free of bins without further droppage.

Other objects, features and advantages of this invention will become more apparent after referral to the following specification and attached drawings in which:

FIG. 1 is a schematic view of an overlying sorting conveyor, an underlying takeout conveyor with the improved bins for receiving and storing the sized and graded lumber therebetween;

FIG. 2 is a perspective view of the hydraulic piston actuation for simultaneously raising and lowering the board-receiving bunks;

FIG. 3 is a perspective view of the apparatus for remotely engaging and disengaging the bunks from their supporting cables upon release of lumber stacked thereon to the takeoff conveyor;

FIG. 4 is a perspective view, partially broken away, illustrating the operation of the lock mechanism on each of the bunks; and FIG. 5 is a schematic diagram showing apparatus for controlling the raising and lowering of the bunks.

Referring to FIG. 1, overlying sorting conveyor A and underlying takeout conveyor B are shown with the bins C1 through C36 extending therebetween (bins C5 through C35 being omitted for convenience of illustration). Referring additionally to FIG. 2, each of the bins includes two L-shaped bunks D. Bunks D are supported at either end by cables E and from an underlying surface for supporting lumber accumulated thereon.

Operation of the bins C can be immediately understood. When the bins are initially filled with lumber, as in the case of bin C1, bunk D is drawn by cables E immediate the release point of sorting conveyor A. As the lumber accumulates, bunk D is sequentially lowered so that cables E provide expanding, vertical sidewalls (see bins C2 and C3). When completely filled, the bunks are lowered below the sides of takeout conveyor B and cable E is released from one end thereof as in the case of the fully lowered bunks D of bin C4. The sized, graded and counted lumber in the bin can be conveyed away from takeout conveyor B for further processing such as planning, stacking and kiln drying.

Sorting conveyor A is a standard item of manufacture. This conveyor A includes tow endless belts 14 having an upper run rotating toward the mill and a lower run rotating from the mill carrying fresh cut boards 27 from the mill to bins C1 through C36.

Each belt 14 has affixed thereto at preselected spatial intervals a plurality of L-shaped brackets 16. Brackets 16 fasten to the belts at the vertical member of the L and extend parallel to the belts at their horizontal member of the L away from the vertical member in a direction opposite to the direction of belt movement.

L-shaped brackets 16 are loaded with fresh cut boards 22 by conveyor 20. Conveyor 20 has its end 24 positioned immediate vertically downward running end 27 of sorter conveyor A. Boards 22 are tuned in sequential release from conveyor 20 so as to fall into the upwardly extending angles of brackets 16.

When brackets 16 receive boards 22, they pass along a path which immediately overlies the open end of bunks C1–C36. Typically, the boards have been visually graded by an operator (not shown) at the mill and remotely sized by sizing apparatus (also not shown). A computer memory correlates the grade and size of each board with a bin destination and affects release point overlying a preselected bin (also by apparatus not shown).

The sorting conveyor here illustrated is of the type manufactured by the Irvington Company of Portland, Oreg., well understood in the art, and for purposes of brevity will not be further explained herein.

Takeout conveyor B is shown in FIGS. 1, 2 and 3. The takeout conveyor includes three endless belts 30 having an upper run moving away from the mill for the transport of the sized, graded and counted lumber and a lower run returning toward the mill. The belts are driven and supported at either end by wheels 35 and 36. Intermediate wheels 35 and 36, endless belts 30 are supported by upper chain race 32 and lower chain race 34.

Chain races 32 and 34 each comprise a U-sectioned channel having upwardly extending vertical sidewalls into which endless belt 30 fits. Upper chain races 32 are supported on the upper horizontal web of an I-beam 35 which is, in turn, supported on framings 36. Lower chain races 34 immediately underlie upper chain races 32 for each of endless belts 30 and are directly supported on a poured concrete foundation.

With reference to FIG. 2, a perspective section of a typical bin C is illustrated. It can be seen that bin C is located between paired vertical supports 40 and 41 at each end. Vertical supports 40 and 41 support a rectangular framework 45 overlying each bin.

Framework 45 includes paired transversely extending I-beams 46 and 47. These beams are supported directly on top of beam 42 spanning paired vertical supports 40 at the right-hand edge of FIG. 2. At the opposite end I-beams 46 and 47 are supported by beam 43 spanning paired vertical supports 41 at the left-hand side of FIG. 2. I-beams 46 and 47 are cantilevered outwardly and beyond beam 43 and support beam 48 which is slightly inclined from horizontal, sloping upwardly from beam 46 to beam 47. As will hereinafter become apparent, beam 48 supports a portion of cables E for raising and lowering of bunks D.

Bunks D are fabricated from rectangular sectioned beams 50 and 51 joined in an L-shaped configuration. Beams 50 provide the underlying, spanning and horizontal member of the L-shaped bunks D and beams 51 extending vertical upward from one end of horizontal member 50 provide the vertical members of L-shaped bunks D.

It will be noted that the horizontal member 50 of L-shaped bunks D extends in the direction of conveyance provided by takeout conveyor B. This orientation of bunks D is made so that when the bunks are fully lowered, as in the case of bin C4, the counted, graded and sized lumber can be conveyed away clear of the bunks.

Beams 51 in cooperation with spanning member 50 provides a function not immediately apparent. When boards 22 accumulate within any of the bins C1 through C36 in any substantial quantity, the lower portion of the accumulated load will tend to bulge the flexible cables outwardly and to the sides of the stacked lumber within any given bin (as shown in the case of bin C3). Where the bins are spaced in close proximity to one another, contact between adjacent and fully loaded bins can be anticipated. Vertically extending member 51 arrests this tendency on one side of the bin; consequently, the respective bins can be given a relatively close spacing.

The upper extremity of each of the members 51 is provided with slope 54 extending from the point of attachment of cable E inwardly and towards the spanning member 50 of each of bunks D. Slope 54 prevents boards from being accumulated on the surface at the upper end of vertically extending members 51 when the bins are unloaded.

Raising and lowering of bunks D in provided by cables E which are in turn actuated by hydraulic cylinder 60 attached to transverse beam 46 adjacent vertical supports 41. Rod 61 of piston 60 moves towards and away from cylinder 60 and has provided at the end thereof a yoke 62 to which an underlying cable 63 and overlying cable 64 are fastened. Underlying cable 63 passes over first sheave 66 mounted to the lower end of inclined beam 48, over second sheave 68 on the upper end of inclined beam 48 and thence to second yoke 70. Second yoke 70 has attached thereto underlying cable strand 71 and overlying cable strand 72. Strand 71 passes over sheave 73 and then depends downwardly to the end of vertical member 51 of left-hand bunk D. Likewise, overlying cable strand 72 passes over sheave 74 and then depends downwardly to vertical member 51 of right-hand bunk D. Sheaves 73 and 74 are the members from which the downstream sides of bunks D are raised and lowered from points on transverse beam 47.

Returning to yoke 62, the path of overlying cable 64 can be easily observed. Cable 64 passes about sheave 75 and then to second yoke 76. At yoke 76, the cable divides into lower strand 77 and upper strand 78. Lower cable strand 77 passes over sheave 80 and then depends downwardly to the upper end of horizontal member 50 to left-hand bunk D. Upper cable Strand 78 passes over sheave 82 remote from yoke 76 and then depends downwardly to horizontal member 50 of right hand bunk D. Sheaves 80 and 82 are the members from which the upstream sides of bunks D are raised and lowered.

It will be understood that the lengths of fresh cut boards 22 received within the bins can vary. Consequently, the points of attachment of sheaves 73 and 80 are one hand and sheaves 74 and 82 on the other hand can be changed to vary the transverse spatial interval between the bunks to any desired interval.

Raising and lowering of the bunks D by cables E can be readily understood. When rod 61 is hydraulically withdrawn into the interior of hydraulic cylinder 60, yoke 62 and its attached cables 63 and 64 are drawn inwardly. This causes respective yokes 70 and 76 to shorten the length of cables E extending between the transverse beams 46 and 47 and bunks D. Upward movement of the bunks D towards the sorting conveyor A will result. Conversely, when rod 61 is hydraulically urged to extend outwardly of cylinder 60, yoke 62, cables 63 and 64 together with their connected yokes 70 and 77, respectively, will cause lowering of bunks D.

Sheaves 73 and 80 supporting one bunk D and sheaves 74 and 82 supporting the remaining bunk D are typically positioned so as to raise and lower their respective bunks on one side of endless belts 30 of takeout conveyor B. This positioning of the sheaves overlying the bunks is made so that when the bunks are fully lowered spanning horizontal member 50 of each of the bunks will settle parallel and adjacent to belts 30 of takeout conveyor B. Bunks D are illustrated in this fully lowered position in FIG. 3.

When bunks D are fully lowered so that spanning members 50 extend parallel to each of belts 30 of takeout conveyor B, the bunks become supported at their forward and rearward ends on spaced framings 36. As resting on framings 36, it will be noted that the upper surface of horizontal member 50 is below the upper and exposed run of endless belt 30 of takeout conveyor B. Consequently, if cables E are released from their points of attachment to spanning member 50, stacked lumber within each of the bins will be conveyed away by takeout conveyor B.

Referring to FIG. 1, it will be noted that the lumber accumulated within bin C3 serves to bulge cables E outwardly and away from the contained lumber load. Frequently, the weight of lumber within each of the bins C3 will cause considerable tension to be exerted on the cables even though the bunks are fully lowered. Consequently, provision must be made for levered and remote release of the cables from spanning members 50 of each of the bunks. The apparatus for such a levered and remote release is fully illustrated in FIGS. 3 and 4.

Referring to FIG. 3, each I-beam 35 at a point immediately below the cable attachment to horizontal bunk members 50 has a journal (this journal being hidden from view in FIG. 3) attached to the lower web of beam 35. These journals in turn support shaft 90 extending transversely of takeout conveyor B. Shaft 90 includes at end 93 remote from the bin C, foot-actuated lever 94.

Adjacent a side of each of horizontal members 50 of bunks D there are fastened to shaft 90 a radially extending bar 95. Upon counterclockwise and downward rotation of foot-actuated lever 94, each of the bars 95 pivots upwardly to engage complementary and pivotally mounted bars 96 on the ends of members 50 underlying the point of attachment of cables E. Bars 96 pivot about points in the ends of horizontal members 50 causing the ends of bunks D to be released from the cables E. This release of the cables E can be fully illustrated with respect to the detail of FIG. 4 showing a typical latch for release of the cables.

Bar 96 is fastened to shaft 97 which extends outwardly of horizontal member 50. Shaft 97 is journaled to the sidewalls 98 and 99 of the rectangular sectioned member 50.

Shaft 97 has fixedly attached between sidewalls 98 and 99, a lever 102. Upon upward and counterclockwise rotation of lever 96, lever 102 rotates to release cables E from their attachments.

Forwardly of shaft 97 and lever 102, rocker arm 105 is journaled to horizontal shaft 107 intermediate sidewalls 98 and 99 of horizontal spanner 50. Rocker arm 105 at its outwardly protruding end, defines downwardly hooked finger 112. This member engaged cable E. Rocker arm 105 at its opposite end adjacent lever 102, defines lever-engaging step 115. This step is released from lever 102 to permit release of cables E from member 50 of bunks D.

Cable E at its point of attachment to horizontal spanner 50 includes spliced eye 118 fastened to an aperture in the upward portion of rectangular plate 120. Plate 120 has rectangular aperture 122 configured at the bottom. Aperture 122 at its bottom portion, serves to engage finger 112 of rocker arm 105.

Extending outwardly from sidewalls 98 and 99 of bunk D there is an upwardly open pocket 130. Pocket 130 has tapered sidewalls that extend downwardly and towards finger 112 on rocker arm 105. This pocket serves to gather and position plate 120 so that aperture 122 is aligned in a position of engagement with finger 112 when connection of the cable E to spanning member 50 of bunk D is desired.

Operation of the lock mechanism illustrated in FIG. 4 is easily understood. Typically, upward and counterclockwise movement of lever 95 urges overlying lever 96 to rotate in a similar direction. Rotation of lever 96 through shaft 97 causes lever 102 to pivot out of a position of engagement with step 115 on rocker arm 105. When such rotation has occurred, finger 112 on rocker arm 105 will be free to rotate upwardly releasing plate 120 at square aperture 122. As illustrated with respect to bin C4 in FIG. 1, actuation of takeout conveyor B will cause cable E and plate 120 to pass upwardly and over the load of sized, graded and counted lumber when it is transported clear of the bin by the takeout conveyor.

When the conveyed stack of lumber is free and clear of the respective bunks, plates 120 will depend to their normal positions adjacent the ends of the spanning members 50 of each of the bunks D. Typically, an operator will place each plate 120 interior of the gathering pockets 130 for its respective bunk D. When positioned interior of the pockets, plates 120 at the lower portion of square aperture 122 will be moved to underlie finger 112 of rocker arm 105. Arm 105 will have returned to its normal counterclockwise rotated position through the bias of coil spring 131 fastened between lower wall 132 of square sectioned member 50 and the outward portion of rocker arm 105 adjacent finger 112. Likewise, lever 115 will return to its normal position due to the weight of lever 96 fixedly attached to shaft 97. Thus, the latches at the ends of member 50 of bunk D will be readied for a repeated cycle of operation.

Sequential lowering of the bunks D for each bin C1 through C36 can either by manually or preferably remotely controlled. A typical circuit for such remote control is illustrated schematically with reference to FIG. 5.

Referring to FIG. 5, it will be seen that piston 60 has three limit switches 141, 142, and 143 to sense the position of extension of piston rod 61 from its hydraulic piston 60. As illustrated in FIG. 5, yoke 62 and attached cables 64 deflect sensors from solenoids 141–143 dependent upon position of the rod 61 in extension from piston 60.

Motive force is furnished to piston 60 by a hydraulic pump 145. Pump 145 is connected to a motor controller 146 having up, stop and down actuators for the hydraulic pump. Typically, motor controller powers pump 145 to move hydraulic fluid from one end of cylinder 60 to the other end of cylinder 60 positioning rod 61 to any desired location between a maximum position of extension and a maximum position of retraction.

A hand controller 150 is operatively connected to the motor control 146. Specifically, controlled 150 has a top "up" button for actuating control 146 and motor 145 to retract the cylinder and thus raise bunks D to their elevated position. Additionally, motor control 150 has lower "down" button which can be depressed to lower bunks D.

It will be noted that each of the solenoids 141–143 is connected to the stop circuit of motor control 146. When piston rod 61 at yoke 62 deflects any one of the sensors of the solenoids, the hydraulic pump stops, maintaining rod 61 in a stationary position with respect to cylinder 60.

As boards are deposited within each of the bins signals from the central computer of the sorting conveyor A are received at first and second counters 151 and 152, respectively. These counters, in cooperation with the circuit illustrated, serve to provide for a remote two-stage lowering of the bunks D upon their being filled with fresh-cut lumber boards 22.

Assuming that bunks D are fully raised and therefore rod 61 is fully retracted into cylinder 60, raising bunk D within the bin C. As the boards are placed, counter 1 will accumulate in its memory the number of boards deposited. Upon reaching a preset number of boards, counter 1 will through an electrical connection actuate the down circuit of motor control 146. The hydraulic pump will be driven in a direction to extend piston rod 61. Such extension will continue until the sensor of solenoid 142 is deflected.

Upon deflection of sensor 142, a signal will be transmitted to the stop circuit of motor control 146. This will stop pump 145, maintain rod 61 in an extended position adjacent the solenoid, and provide for lowering of the bunks D to the position illustrated in bin C3.

Filling of the bin will continue with signals from the computer being channelled through counter 1 to counter 2. When counter 2 detects that the bin is in the full state, it will illuminate a light 155, either located at a control panel, adjacent the side of the bin, or both.

Typically, an operator will depress the down button on control 150 actuating the hydraulic pump to fully extend rod 61 from cylinder 60. Such extension will continue until the sensor or solenoid 141 is deflected. Upon deflection of the sensor of solenoid 141, the pump will again be stopped and the bunks D of the bin lowered to their discharge position illustrated in FIG. 4.

Assuming that the discharge of lumber from the bin has been fully made and cable E reconnected to bunks D, the "up" button of controller 150 will be depressed. This will actuate motor control 146 and pump 145 to cause piston rod 61 to be fully retracted. Thus the cycle can be repeated.

These and other modifications of my invention may be practiced, it being understood that the form of my invention as described above is to be taken as a preferred example of the same. Such description has been by way of illustration and example for purposes of clarity and understanding. Changes and modifications may be made without departing from the spirit of my invention.

We claim:

1. In a lumber sorter having an upper sorting conveyor for releasing lumber at preselected points along its conveyed path, means for removing accumulated lumber from positions underlying said preselected points, and a plurality of bin means therebetween, each bin means disposed for receiving lumber from one of the preselected discharge points along the path of said sorting conveyor and depositing lumber on said removing means therebelow, the improvements in said bin means comprising: at least one member for forming bottom of said bin means, said member vertically movable between said sorting conveyor and removing means therebelow; vertical cable supports attached to said member for maintaining said member in a position for supporting lumber accumulated thereon, and cooperating with said bottom means to form part of said bin means; and means for taking up and letting out said cables from points overhead of said removing means to maintain an interval between said member and the release point of said sorting conveyor sufficient to prevent splitting of said lumber upon release to the bin.

2. The invention of claim 1 and wherein said removing means comprises a conveyor.

3. The invention of claim 1 and wherein said cable supports depend from points immediately below the path of said sorting conveyor.

4. In combination: an upper sorting conveyor for releasing lumber at preselected discharge points along its conveyed path; a lower and underlying takeout conveyor for conveying away lumber; at least one horizontal member located at a discharge point of said sorting conveyor and movable between a first position below the path of said takeout conveyor and a second position immediately below the discharge point of said sorting conveyor; cable supports attached to said member for maintaining said member is support disposition for supporting lumber discharged from said discharge points said cable supports forming sidewalls for maintaining lumber on said horizontal member; means for taking up and letting out said cable supports from points over the path of said takeout conveyor for raising and lowering said member in said supporting disposition; and means for releasing said cables from said member, when said member is in said first position below the path of said takeout conveyor, whereby lumber accumulated in said bin can be conveyed by said takeout conveyor.

5. The combination of claim 4 and wherein said horizontal members have attached at one end thereof an upwardly extending vertical member.

6. In combination, a lumber sorter comprising: an upper sorting conveyor for releasing graded and sized boards at preselected points along its conveyed path; a lower takeout conveyor for conveying away sized, graded and accumulated lumber; said lower takeout conveyor having a conveyed path underlying the path of said sorting conveyor; elongated spanning members for forming a bottom supporting surface for lumber-accumulating bins, a plurality of said members being placed below each said preselected point of said upper sorting conveyor; said members aligned parallel to the paths of said conveyors and movable between a first position immediately under the release point of said sorting conveyor and a second position below the path of said takeout conveyor; cable supports attached to each end of said spanning members and disconnectably connected at at least one end of said spanning members and depending from points overlying the path of said lower conveyor; means for taking up and letting out said cable supports to raise and lower said spanning members between said first and second positions; and means for sequentially lowering said horizontal members from said first position towards said second position responsive to lumber accumulated on said spanning members.

7. The combination according to claim 6 and wherein said takeout conveyor comprises a plurality of endless side-by-side belts and each said spanning member is movable to a second position below and to the side of said endless belts.

8. The combination according to claim 7, wherein said cable supports prevent movement of said lumber on said lower takeout conveyor when connected.

9. The combination according to claim 7, wherein said cable supports form sidewalls for said lumber-accumulating bins.

* * * * *